Nov. 30, 1965  J. VAN DER SCHOOT  3,220,154
METHOD AND DEVICE FOR HANDLING OBJECTS
Filed Feb. 13, 1962  12 Sheets-Sheet 1

INVENTOR.
Jelle van der Schoot,
BY
Paul & Paul
ATTORNEYS.

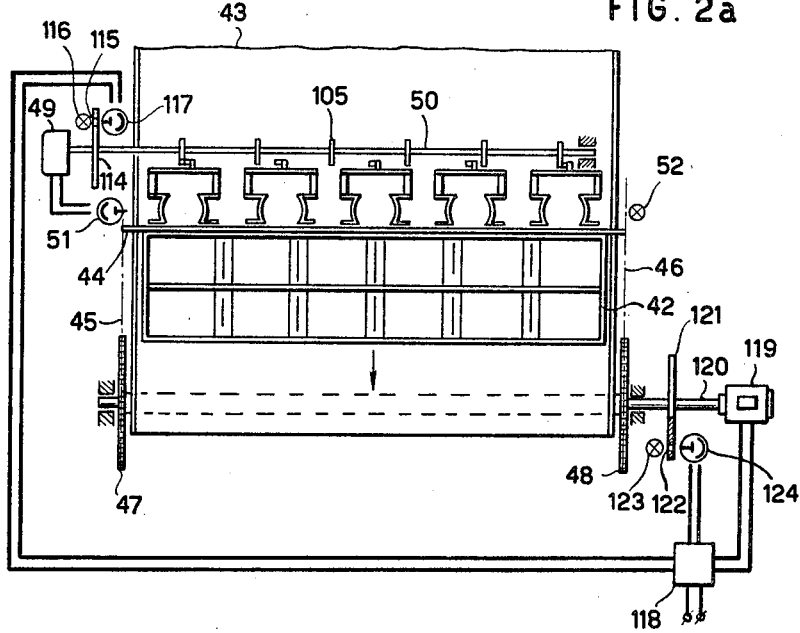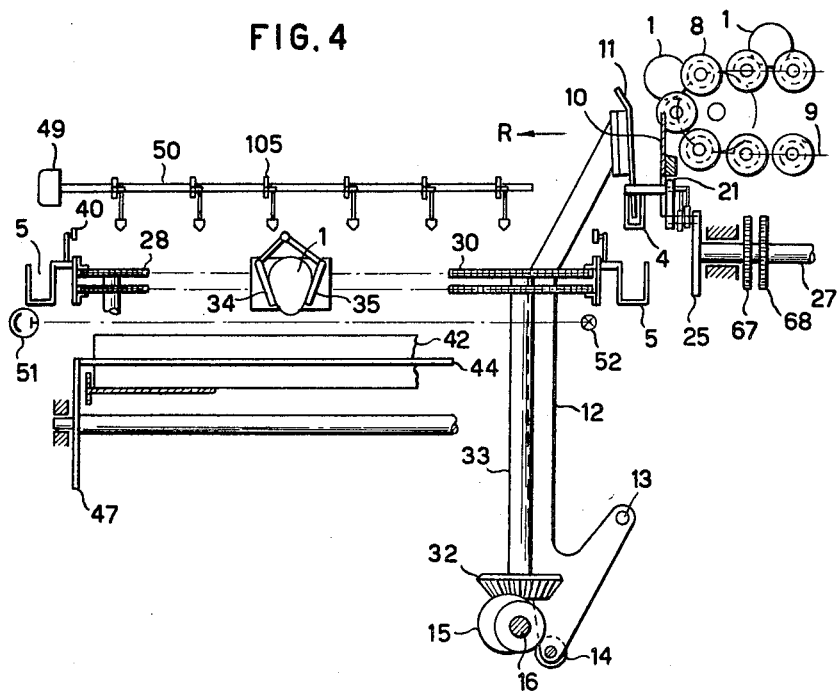

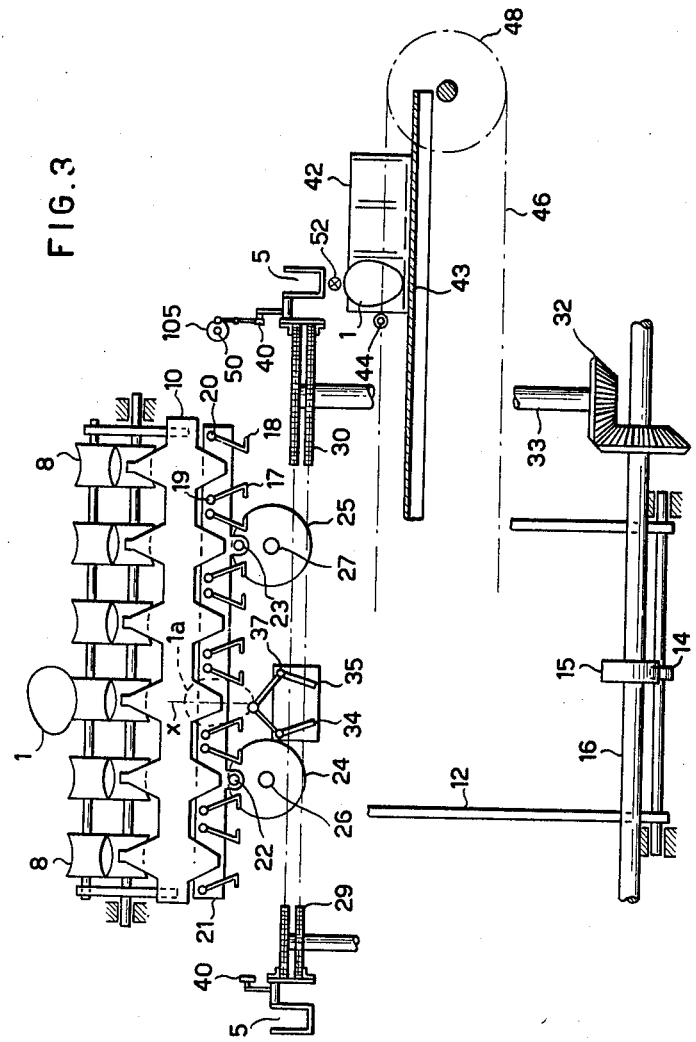

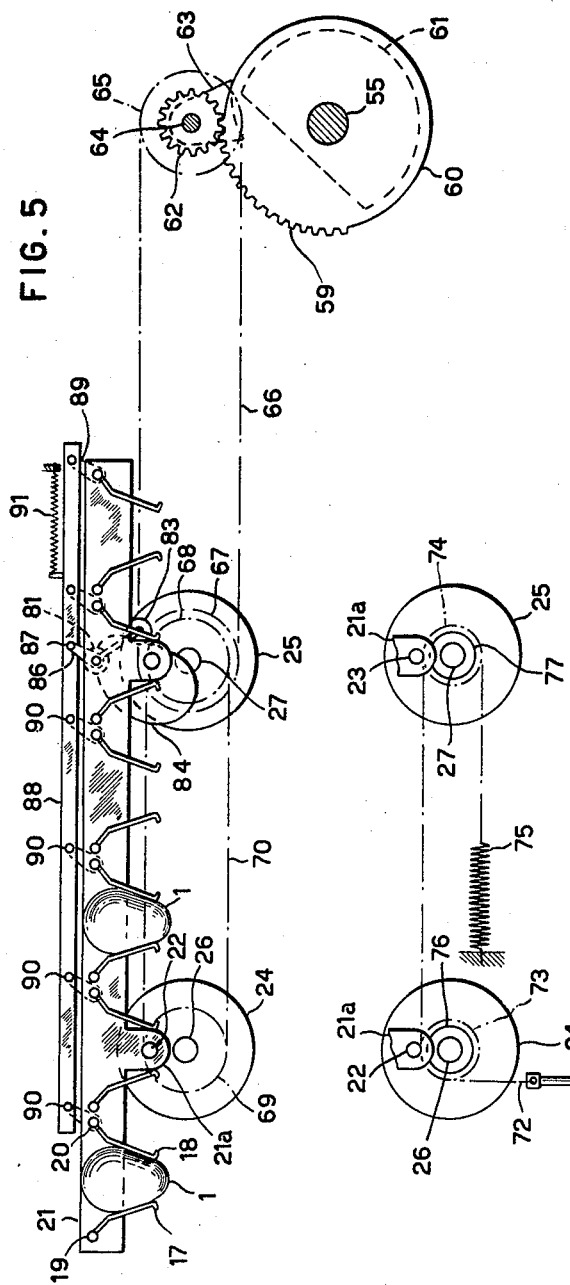

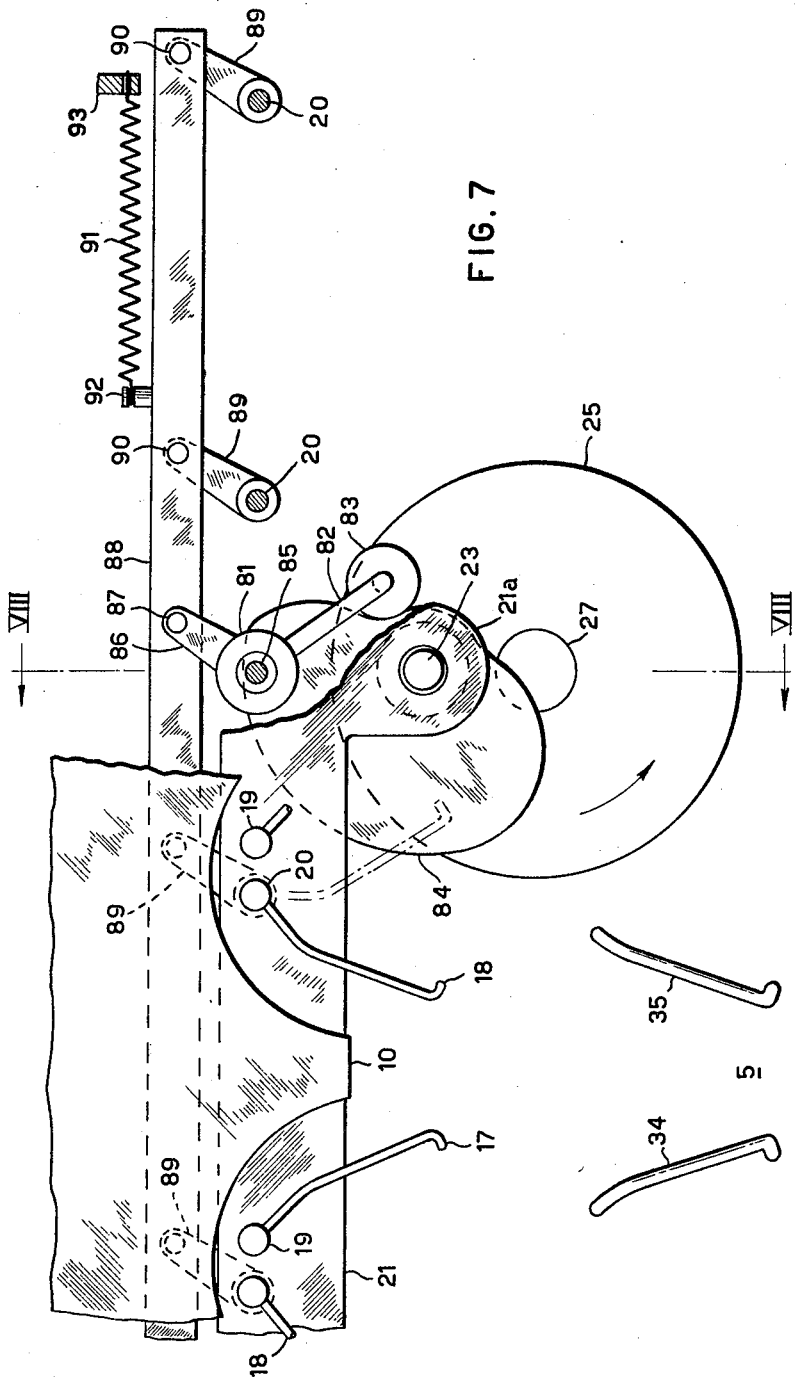

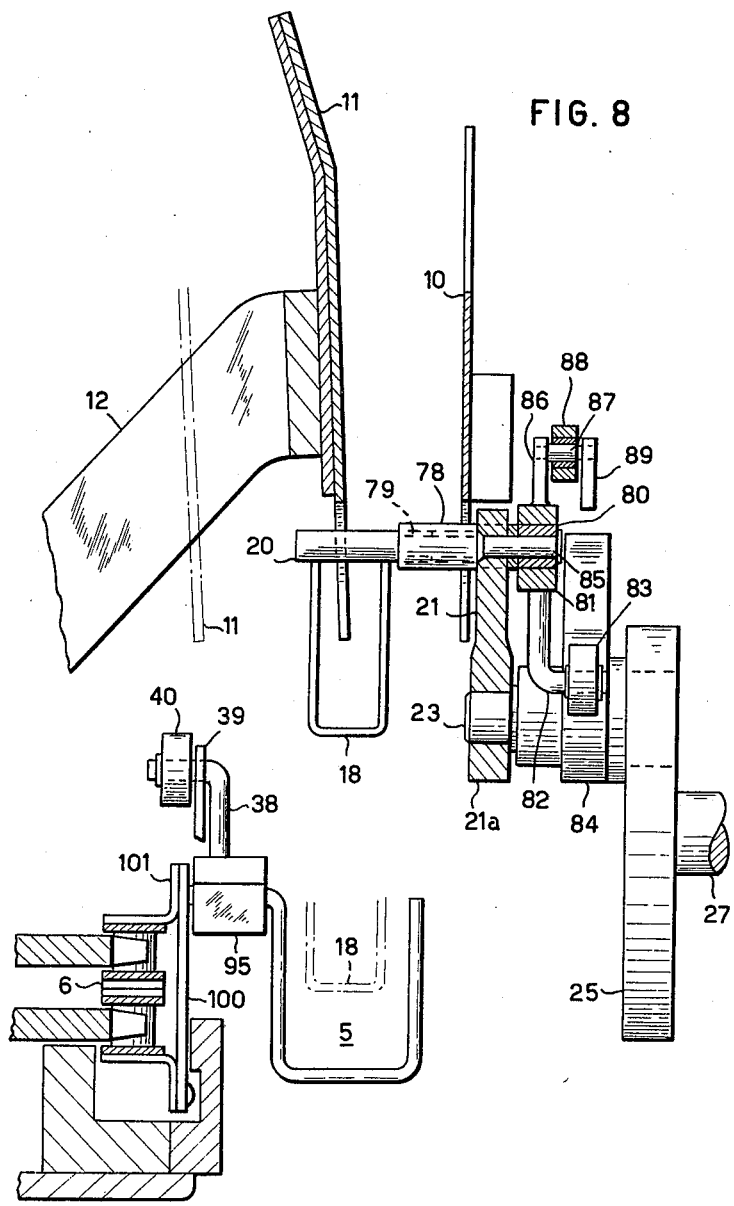

Nov. 30, 1965   J. VAN DER SCHOOT   3,220,154
METHOD AND DEVICE FOR HANDLING OBJECTS
Filed Feb. 13, 1962   12 Sheets-Sheet 8
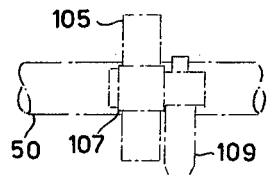
FIG.10
FIG.9
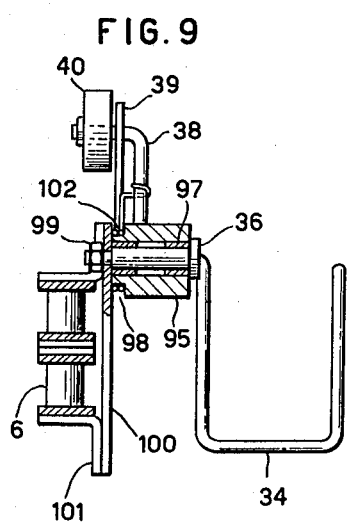
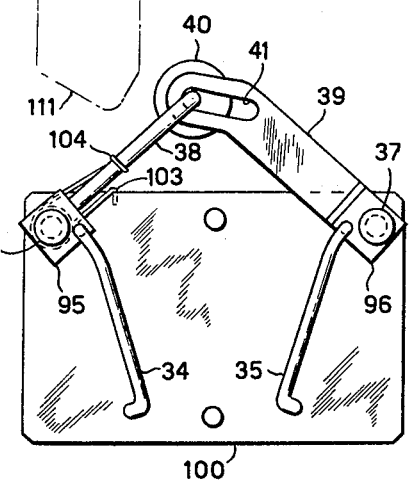
FIG.11
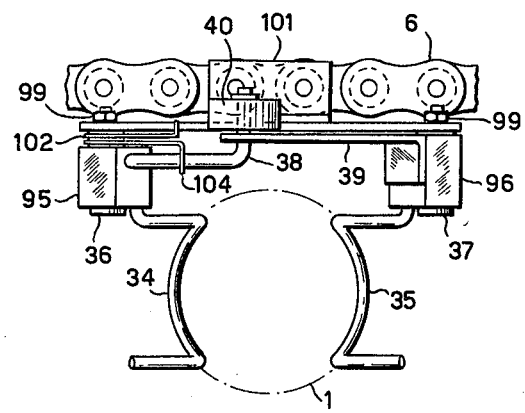
INVENTOR.
Jelle van der Schoot,
BY
Paul & Paul
ATTORNEYS.

Nov. 30, 1965   J. VAN DER SCHOOT   3,220,154
METHOD AND DEVICE FOR HANDLING OBJECTS
Filed Feb. 13, 1962   12 Sheets-Sheet 10

INVENTOR.
*Jelle van der Schoot,*
BY
*Paul & Paul*
ATTORNEYS.

Nov. 30, 1965   J. VAN DER SCHOOT   3,220,154
METHOD AND DEVICE FOR HANDLING OBJECTS
Filed Feb. 13, 1962   12 Sheets-Sheet 12

INVENTOR.
Jelle van der Schoot,
BY
Paul & Paul
ATTORNEYS.

United States Patent Office 3,220,154
Patented Nov. 30, 1965

3,220,154
METHOD AND DEVICE FOR
HANDLING OBJECTS
Jelle van der Schoot, Aalten, Netherlands, assignor to Van Katwijk's Papier- en Cartonverwerkende Industrieen N.V., Aalten, Netherlands
Filed Feb. 13, 1962, Ser. No. 173,104
20 Claims. (Cl. 53—35)

Throughout the following description of the invention and in the claims certain unique adjectival terms have been employed to more clearly distinguish parts which may appear to be similar but differ in function. For example, the term "excenter" or "eccenter" has been used with reference to certain pins and discs to highlight the differences between these parts and corresponding parts associated with cams.

Likewise the term "actionating" has been coined to prevent confusion between certain other energizing or actuating functions although the term may in context be the full equivalent of either of those terms.

The invention relates to a process and an apparatus for delivering objects of substantially the same shape and dimensions at a fixed distance one from the other, which objects are periodically simultaneously fed to a number of feeding stations positioned side by side, on the understanding that at each feeding station one or no object is fed per feeding.

Such a situation, with which consequently one or no object is fed to a chosen feeding station, arises rather often in automatic handling, particularly, but not exclusively at the exit of sorting apparatus.

A great difficulty, occurring herein, lies in the fact, that the sorting apparatus very irregularly delivers objects at a chosen exit, for a certain class of objects, for example having a predetermined weight or colour, whilst the delivery to the packaging machine requires that the objects are situated at equal distances from one another. When envisaging a mechanical system, doing this satisfactorily without human action, different difficulties are met. The first one is, that the simplicity can be considerably increased, if the objects at all feeding stations can be fed to a single transport device. Here however, it is very difficult to ensure regular filling of all available pockets, because the transport device has to take up objects simultaneously, unless it consists of the same number of tracks as there are feeding stations. The result thereof is, that consequently the transport device will be irregularly filled.

During the delivery of the objects the same difficulty arises but now it is a requirement, that is, that all delivery stations are provided with an object before the first delivery station receives the next object. In other words a regular filling is required.

Detailed experiments have shown the great difficulty that will occur with discontinuous movement of the transport device. In that way a delivery can be attained but the problem arises, either to let the transport device move partly discontinuously and so complicate it, or to drive the transport device fully discontinuously. Discontinuous movement forms a very serious impediment for obtaining a reasonable working speed. Moreover noise and shocks will be difficult to avoid, if a discontinuous drive is used, which is objectionable in view of the mechanical device performing the process and of the objects to be delivered, if these are sensitive to shocks, such as for example eggs.

The invention finds a way out of the foregoing difficulty, by which, as experience shows, a smooth continuous running is possible with a working speed, considerably above that of any unit constructively comparable to the invention.

The above mentioned purposes are attained according to the invention, in that the objects of all feeding stations are simultaneously put on to a transport device moving continuously, on which they are situated one behind the other in the direction of movement of the transport device and that they one by one are taken off the transport device at a number of delivery stations situated one behind the other in the transport direction such that an object is taken off at a delivery station, if the delivery station situated beyond it in the transport direction has taken off an object.

For attaining a continuous smooth working preferably it is provided by this according to the invention, that, after taking off an object at the first delivery station, looking in the transport direction, the next object stays on the transport device to be taken off at the last delivery station.

In applying the invention the difficulty may arise, that a delivery mechanism, when it takes up an object, does not act quick enough to bring the delivery mechanism in a position for taking an object from the transport device, if an object to be delivered is present in the next location. Now, however, the difficulty arises, that a delivery mechanism coming into operation needs a certain time, so that an anticipating register is necessary, or a time margin between coming into operation of the delivery mechanism. A further aspect of the invention shows a very simple way out in this case. This consists in, that the distance between the objects on the transport device is longer than the distance between the delivery stations.

This, for example, is attained very simply in the most important application of the invention, up to now, viz, egg handling. When the eggs are positioned at distances from centre to centre corresponding to the horizontal position of the axes of the eggs (as is the case in the sorting machines) and are positioned on the transport device in the tip-down position proper for packaging, the distance between the centres of the eggs is longer than the distance between the delivery stations, when the delivery stations have been rightly adapted to the packaging machine conceived for a mutual distance between the centres of the eggs based on their largest diameter perpendicular to their axes.

In this connection, according to a further aspect of the invention provision is made, that, when the objects have a greater length than width, particularly eggs, and are at a distance one from the other at the feeding stations corresponding to their length, the objects are tilted before they come onto the transport device with their greatest length perpendicular to the transport direction.

The invention further covers a device for delivering objects of substantially the same shape and dimensions at a fixed distance, one from the other which objects are periodically simultaneously fed to a number of feeding stations positioned side by side, i.e. that at each feeding station either one or no object is fed per feeding. This device according to the invention contains transfer elements for simultaneously transferring a number of objects to the transport device in a first portion of the track of same and a number of delivery actionating mechanisms mounted one behind the other in the transport direction of the transport device, in which case the delivery actionating mechanisms can take at least two positions: in the first of these (the rest position) they are inactive and let the objects pass and in the second (the working position) they come into operation to achieve the delivery of the objects from the transport device, and in which a means is present to put a delivery actionating mechanism into the working position, when, looking in the transport direction, the delivery device situated in the beyond delivers an object. Preferably it is provided, that the means putting the delivery device into the working position is adapted to put the first delivery device into the working position when the last delivery device delivers an object.

A preferable embodiment of the invention, being constructively simple and which as practice shows, gives full satisfaction, consists therein, that the delivery actuating mechanisms are abutments or stops which in their working position are located in the path of travel of an actionating element of the delivery mechanisms, mounted on the transport device. A simple realisation of this further embodiment consists therein, that the abutments or stops are mounted with different angular positions on a rod rotating about its longitudinal axis, positioned parallel to the transport device, connected to a driving device controlled by the delivery devices and for each time that a delivery device comes into operation the rod makes a rotational step.

In order to prevent shocks that occur during the turning of the rod when a cam strikes from the side against an actionating element of a delivery device, according to a further embodiment of the invention, cam discs are mounted on a rod rotatable round its longitudinal axis, alongside the transport device, co-operating with movable cam elements, which cam elements carry the abutments for the delivery mechanisms, which elements are held against the cam discs by a spring and can be disengaged from these discs contrary the force of the spring.

This embodiment has the advantage that the distance between the delivery stations and particularly between the first and the last delivery station can be chosen with complete independence, without having to take into account whether an element of a delivery device is present near the location of an abutment, when this abutment is brought into the path of movement of the actionating elements of the delivery device.

According to a further embodiment of the invention the relatively long period, minimally available between the coming into operation of the last and the first delivery actionating mechanisms, is used in a practical and simple way because the rod co-operates in such a way with the signal transmitter, that the latter gives a signal, when the rod occupies the position, in which, looking in the direction of movement of the transport device, the foremost delivery actionating mechanism is in the active position, which signal is used for energizing a driving mechanism for displacing the receiving elements of the objects, such as packaging material.

A simple adaptation possibility to packaging material, such as for example boxes with two rows of objects and then an interval for the cover of the box, is obtained by the delivery device for the objects delivered being provided with a signal transmitter rendering the energizing signal inoperative and by the signal transmitter of the delivery device coming into operation after a work stroke of the delivery device, in such a way that successive work strokes form an adjustable self-repeating pattern.

With this preferred embodiment a very simple control device is obtained for the driving device, with which, for an unlimited number of delivery stations, a single control device is sufficient by causing the driving device of the rod to be controlled by a photocell, on which a light beam falls via a light path extending along the transport device in a part, where the objects to be delivered intercept the light beam, which photocell gives a control impulse for each interception of the beam.

According to the invention a further transport and delivery device is provided for objects having approximately identical dimensions in which the falling height of the objects to be delivered is reduced by providing a detecting means for detecting the presence of an object in a delivery pocket of the transport device and a number of delivery stations adapted to be actionated in succession by the said detecting means, a retardation device being present for each delivery station, the retardation period of each individual delivery station being adapted to the time of travel of a pocket from the detecting means to said delivery station.

The invention is further illustrated by means of the drawing, in which some embodiments of the invention are shown more especially egg handling machinery.

FIG. 2a shows a different embodiment of a part of the egg handling mechanism of FIG. 2;

FIG. 3 is another view of the egg handling mechanism of FIG. 2a viewed in the direction of arrow p in FIG. 2;

FIG. 4 is another view of FIG. 2a viewed in the direction of q in FIG. 2;

FIG. 5 shows a front elevation of an egg transfer mechanism together with the driving mechanism for it;

FIG. 6 shows another embodiment of the driving mechanism shown in FIG. 5;

FIG. 7 shows a detail in front elevation of the transfer mechanism;

FIG. 8 shows a cross section along the line VIII—VIII in FIG. 7;

FIG. 9 shows a side elevation of a conveyor bucket;

FIG. 10 shows a front elevation of the conveyor bucket of FIG. 9, part of the discharge actionating mechanism for the bucket being shown in broken lines;

FIG. 11 shows a plan view of the bucket shown in FIG. 9;

Figure 12:
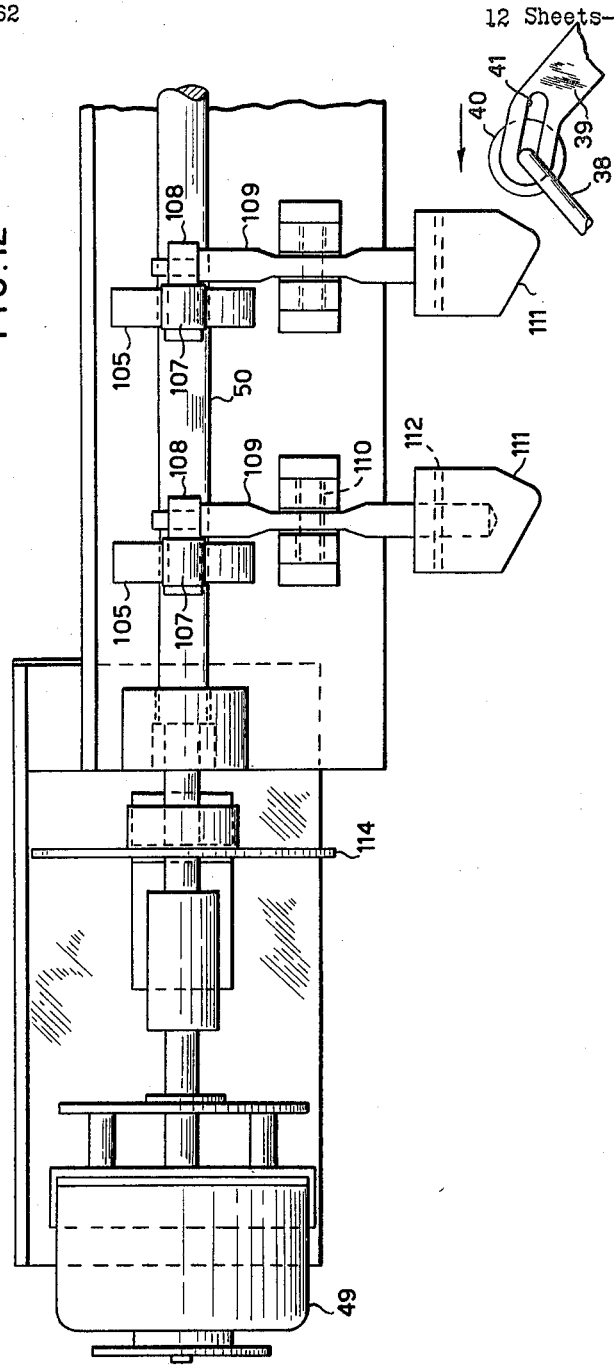
FIG. 12 shows part of the series of discharge actionating mechanisms.
Figure 13:
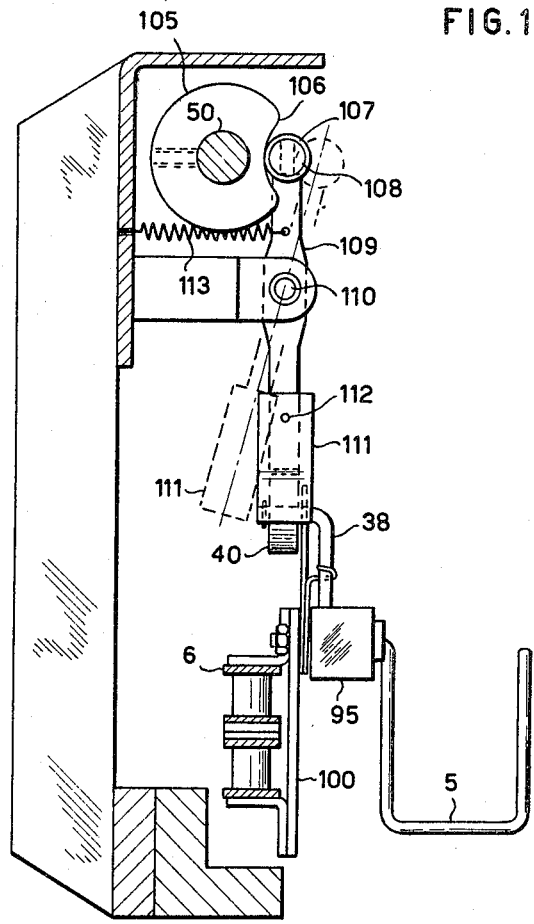
Figure 14:
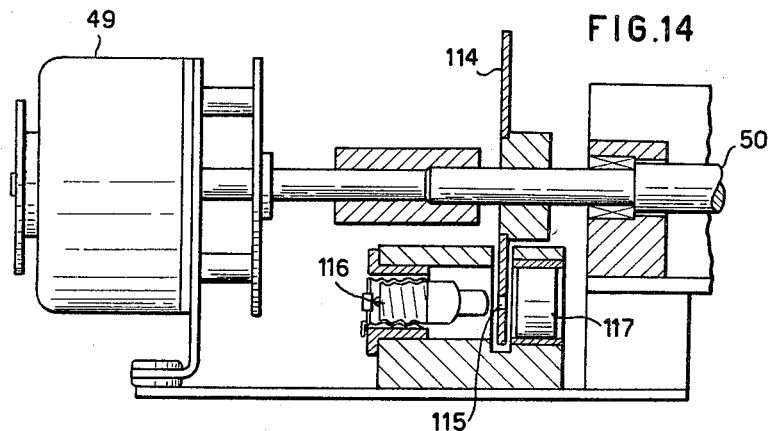
Figure 15:
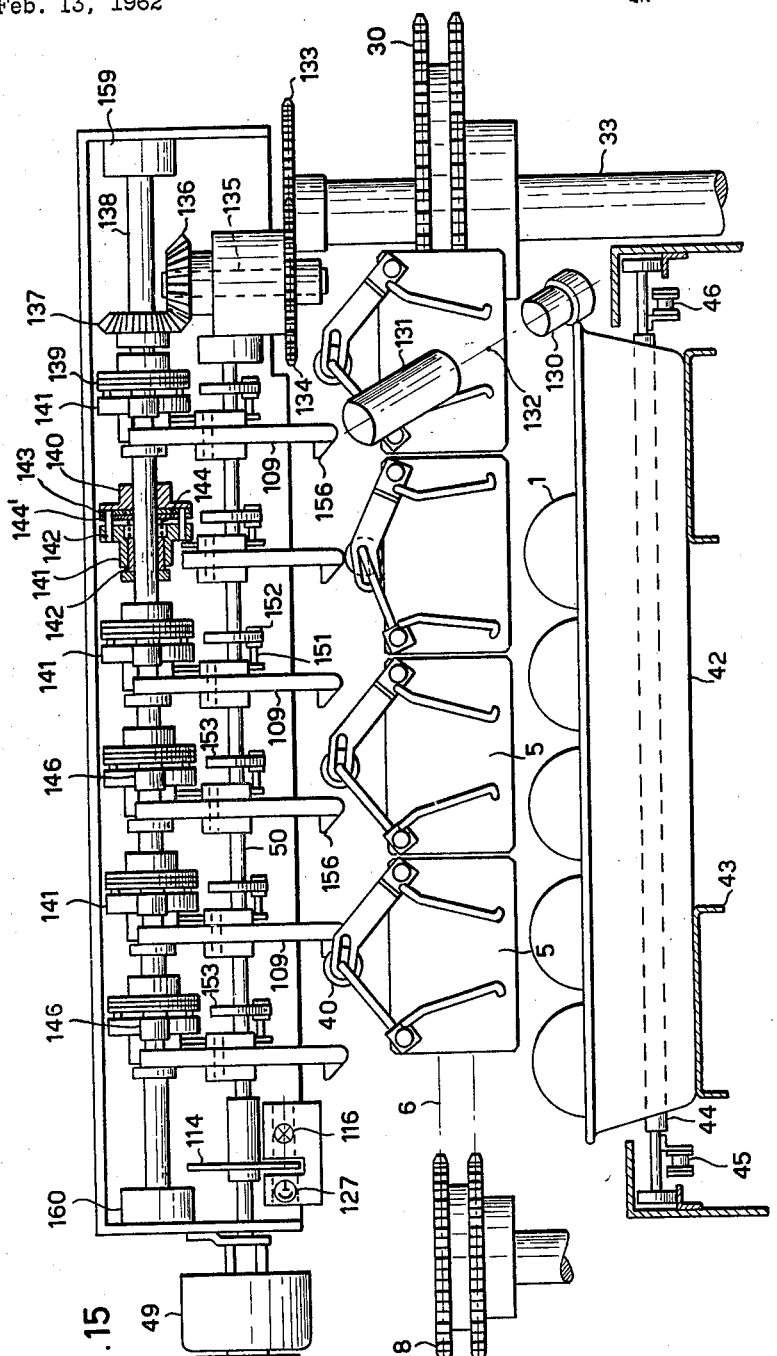
Figure 16:
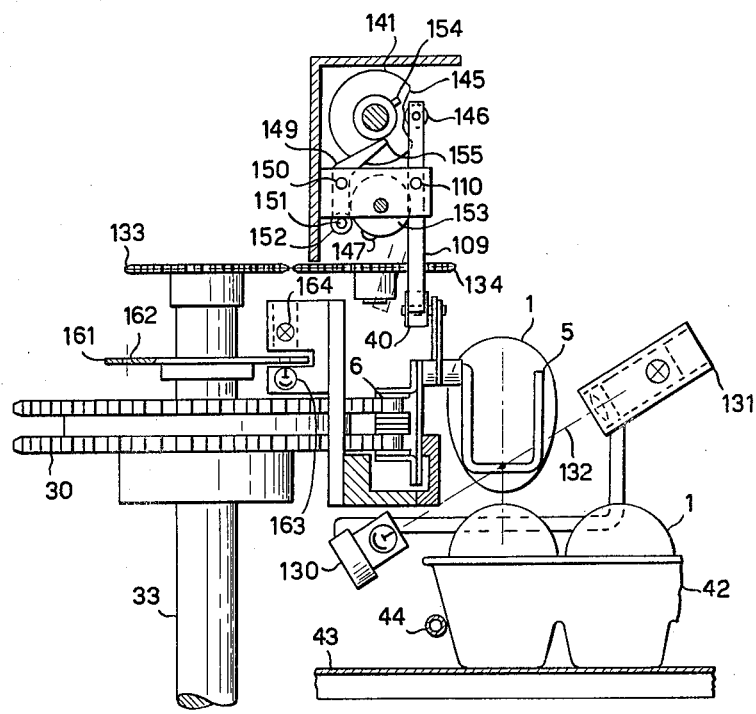

FIG. 13 schematically shows a vertical cross section through the discharge actionating mechanisms of FIG. 12;

FIG. 14 shows a partial horizontal cross section through part of the discharge actionating mechanisms of FIG. 12;

FIGS. 15 and 16 show a further embodiment of the discharge mechanisms.

Figure 1:
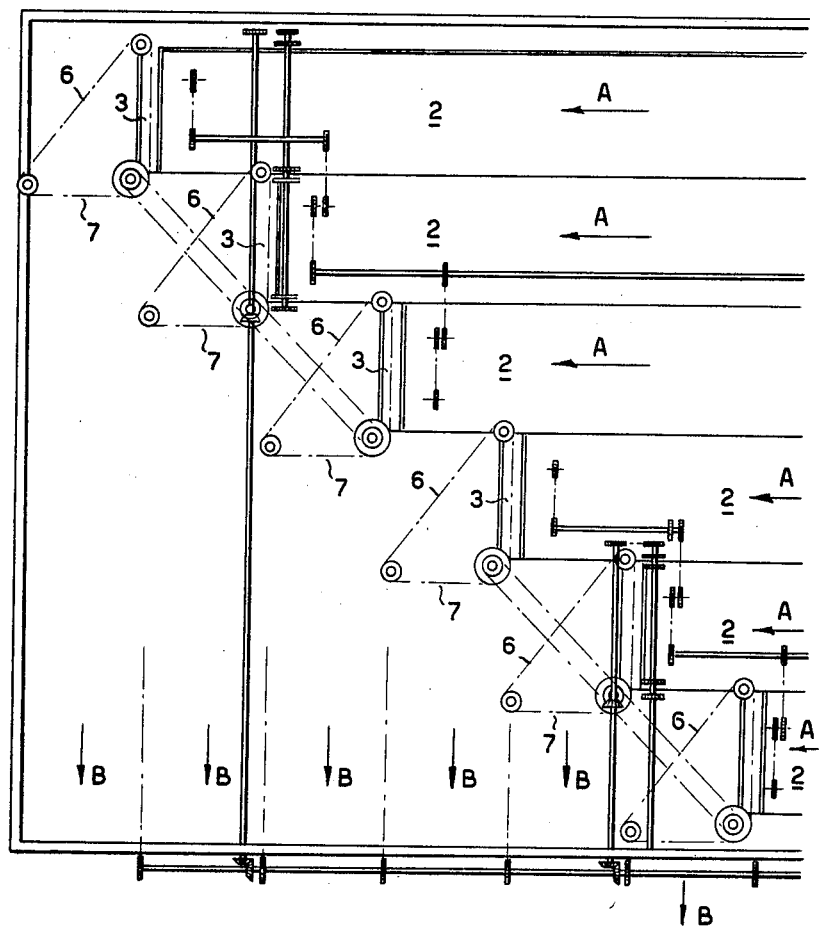
FIG. 1 shows schematically the plan of an egg handling machine according to the invention.

The machine schematically shown in FIG. 1 contains six feeding tracks 2, that can carry eggs and are movable in the direction of the arrows A. At the left side 3 of each track 2 there is provided a set of transfer pockets 4 adapted to transfer the eggs into transport buckets 5. The transport buckets 5 are attached to a chain 6 running along a track in the shape of a rectangular triangle. At 7 a number of discharge stations are present for discharging the eggs from the buckets into egg trays, that are moved in the direction of the arrow b.

FIG. 1 shows a general plan view of an egg handling machine according to the invention. This machine contains six feeding tracks 2, that can be moved in the direction of arrows A. At the left end of each track 2 an egg handling mechanism is present, consisting of a conveyor chain 6 having a part 3 for receiving eggs from the tracks 2 and a discharge part 7 for discharging the eggs into trays, that are moved in the direction of arrows B.

Figure 2:
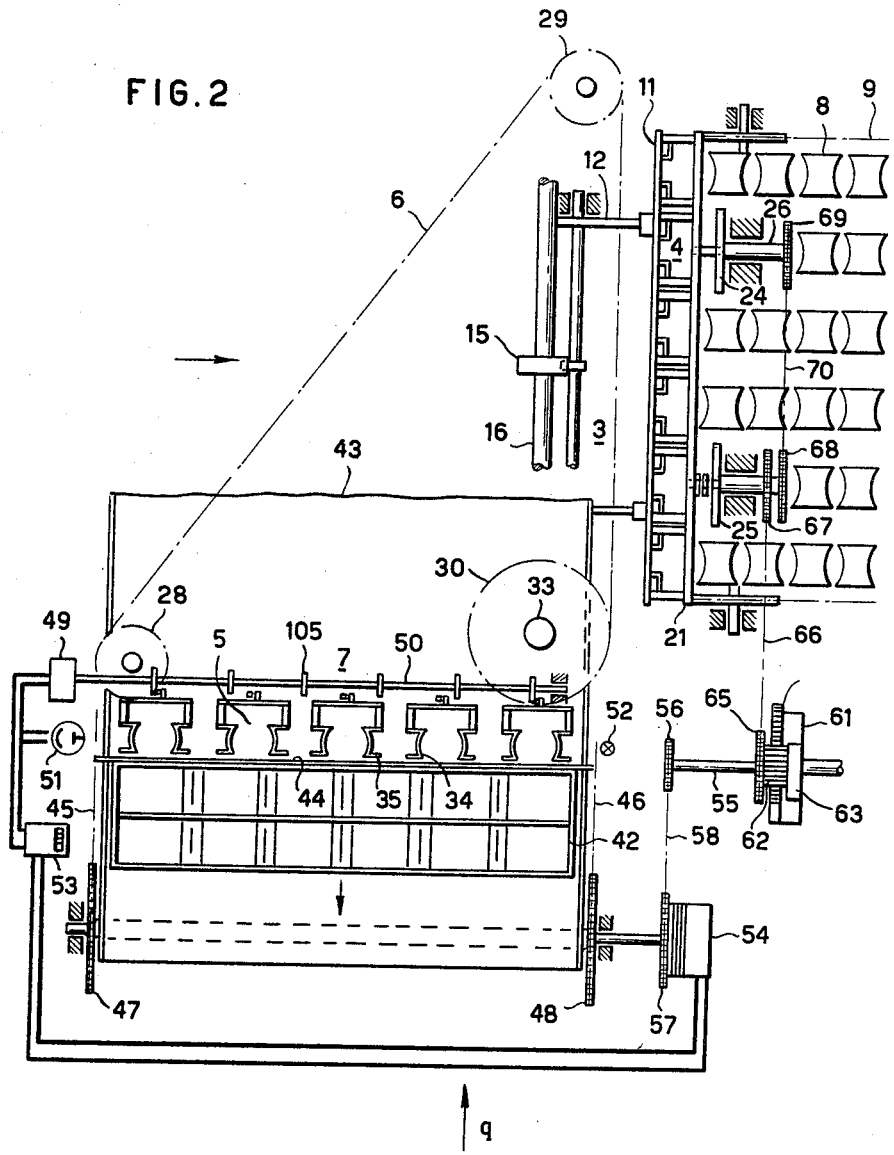
FIG. 2 shows in more detail the plan of one of the egg handling mechanisms of the machine shown in FIG. 1.

FIGS. 2, 3 and 4 show on a larger scale a conveyor 6 and the apparatus cooperating with it.

Each track 2 consists of two chains 9 that by means of connecting bars support six rows of rolls 8. Eggs 1 can be positioned on top of two adjacent rolls (FIG. 4). Across the whole width of each track 2 and at the left end of it a couple of two nearly vertical plates 10 and 11 are mounted. Plate 11 can be moved away from plate 10 in the direction of arrow R. For this purpose the lever 12 supporting plate 10 is pivoted at 13. The cam follower 14 cooperates with cam 15 that is driven by shaft 16 for reciprocating the plate 10 (FIG. 4).

When the plate 10 moves away from the plate 11 the eggs between these plates are oriented with their axes vertically as shown at 1a (FIG. 3) and in this position easily slide downwards into the transfer pockets 4. The action of plates 10 and 11 for orienting the axes of the eggs is completely described in the Netherlands patent specification 98,338 and the Netherlands patent application 249,109.

In short it is indicated that plate 10 is mounted to a lever 12 that is pivoted at 13. A cam follower 14 rotatably mounted in lever 12 cooperates with a cam 15 mounted on a shaft 16.

Below the plates 10 and 11 six transfer pockets 4 are provided. Each transfer pocket consists of two U-shaped brackets 17, 18 which are mounted on shafts 19 and 20 respectively; these shafts 19 and 20 are mounted in a beam 21, that is attached to two crank pins 22 and 23 mounted in discs 24 and 25 (vide FIG. 5).

Discs 24 and 25 are rotatable on axes 26 and 27, so that plate 21 with the transfer pockets can describe a circular path in such a way that the axes of the eggs in the pockets remain vertical.

When the transfer pockets 4 have reached their lowest position, the eggs are transferred to the conveyor buckets 5. This is possible, because at the moment of transferring the eggs the chain 6 carrying the conveyor buckets 5 has almost the same horizontal speed as have the transfer pockets 4. Chain 6 runs over the sprocket-wheels 28, 29, 30 (vide also FIG. 2). Sprocket-wheel 30 is driven from the shaft 16, via conical gears 31 and 32 and the shaft 33 (vide FIG. 3). Because the cam 15 driving the lever 12 is fixedly mounted on the shaft 16 the movement of plate 11 is in synchronism with that of the conveyor 6.

The conveyor buckets 5 (vide also FIGS. 9, 10 and 11) are also constructed from U-shaped brackets 34 and 35, which are pivotally mounted on shafts 36, 37 respectively. Levers 38 and 39 respectively are connected to the brackets 34 and 35. Lever 38 at its upper end passes through a slit 41 in lever 39 and carries a roller 40. Arrived at discharge station 7 the roller 40 can run against an abutment 111, by which brackets 34, 35 are caused to hinge around the shafts 36, 37 and the eggs will be delivered into a box or tray 42 (FIG. 3).

The trays or boxes 42 stand on a plate 43 and can be shifted by a pin 44 mounted on chains 45, 46 that run over sprocket-wheels 47, 48 respectively (FIG. 2).

The discharge stations 7 are controlled by a rotational magnet 49, that can stepwise rotate shaft 50. This shaft is provided with means 105 that can cooperate with the rolls 40 of the conveyor buckets 5 for opening these buckets. The means for actionating rotary magnet 49 and the means 105 will be described more fully later on. They are arranged such that they will act on the conveyor buckets containing an egg in a sequential manner from left to right in FIGS. 2, 2a and 4 that is to say beginning at the downstream side of conveyor 6.

FIG. 2 shows an embodiment in which a photocell 51 receives light from a light source 52. The light path runs below the buckets 5 and is so positioned that an interruption of the light impeding the photocell 51 occurs whenever an egg is discharged from a bucket 5. The electrical signal caused by such interruption controls the rotary magnet 49 for rotating one step and actionates a counter 53. The counter 53 is connected to an electro magnetic clutch 54 and energizes this clutch after receipt of a predetermined number of signals from the photocell 51, which number equals the number of discharge stations controlled by magnet 49.

A sprocket 57 is freely rotatable mounted on a shaft and continuously driven by means of chain 58, sprocket 56 and shaft 55. When clutch 54 is energized the rotational movement of sprocket 57 is transmitted to sprockets 47 and 48 that drive chains 45 and 46 respectively which move pin 44, as described for shifting the tray 42.

FIG. 2a shows another embodiment of the means controlling the movement of the chains 45 and 46 for shifting the tray.

In the embodiment according to FIG. 2a a disc 114 provided with a hole 115 is mounted on the shaft 50. The hole 115 in the position of shaft 50, in which the foremost cam disc 105 is in the working position, permits light from the light source 116 to reach photocell 117. The exit of photocell 117 is connected to the first entry of a bistable multivibrator circuit 118, of which the exit feeds a motor 119. On the shaft of the motor 120 (or coupled with this e.g. by means of a sprocket-wheel transmission) a disc 121 with one or more holes 122 is mounted, which can allow light from light source 123 to activate photocell 124. The exit of the photocell 124 is connected with the second input of the multivibrator circuit 118. A current impulse on this second input de-energizes the motor 119.

The construction of circuit 118 is not specific for the invention and therefore is not further discussed. Each circuit giving off current on a first input terminal after receipt of an impulse and continuing to give off this current until an impulse appears on the second input terminal, can be used. Such multivibrators are known and naturally, when a certain multivibrator circuit requires so, impulse shapers, differentiation circuits and so on can be introduced into the input circuits of 118. Further 118 can be made electronically with tubes or transistors, or electro-mechanically.

FIG. 5 shows a driving means for the discs 24 and 25 carrying the plate 21 with the transfer pockets 4. It will be clear, that the transfer pockets 4 have to stand still for some time to provide an opportunity for the eggs to slide downwards between the plates 10 and 11 and to be oriented. This stand-still period can be obtained by the following mechanism.

On the shaft 55 disc 60 is mounted, having a toothed segment 59. The other portion of the circumference of disc 60 is machined away down to the pitch line. Adjacent the disc 60 and fixedly attached thereto a disc 61 is mounted. A pinion 62 is fixedly mounted on a shaft 64 and engages the toothed portion 59 of disc 60. Fixedly attached to shaft 64 is a latch plate 63 having a concave part adapted to cooperate with the circular segment of disc 61. Shaft 64 carries a sprocket 65, that via chain 66, sprockets 67 and 68 mounted on shaft 27, chain 72 and sprocket 69 drives discs 24 and 25.

The pinion 62 will only be taken along by the toothed segment of 59. When this segment has passed by the latch plate 63 will engage the circumference of disc 61, so that shaft 64 is locked. The number of teeth of the toothed segment 59 is chosen such, that the pinion 62 only performs one revolution per revolution of shaft 55 which is being driven continuously.

Another embodiment of the means for obtaining the periodical stop of the transfer pockets 4 is shown in FIG. 6. To the piston rod of a cylinder 71 a chain 72 is connected, which runs over sprocket-wheels 73, 74 and to its end a return spring 75 is attached. The sprocket-wheels are situated on free-wheel-couplings 76, 77. The stroke length of the piston rod 72 corresponds to one complete revolution of the sprockets 73 and 74. Consequently the shafts 26 and 27 will rotate one revolution in one direction for each stroke of piston rod 72.

The transfer device containing the transfer pockets is further illustrated in FIGS. 7 and 8.

The beam 21 constitutes the carrying element for the brackets 17 and 18. With respect to this beam the brackets 17 are stationary, but the arms 18 can pivot on shafts 20, which can rotate in bearings 79 of sleeves 78, fixedly connected to the beam 21. Each bracket 18 is fixedly connected to one end of an arm 89, the other end of which is rotatably mounted to a strip 88 by means of a pin 90. At 92 a tension spring 91 is mounted to the strip 88, the other end of said spring being attached to part 93 fixedly mounted with respect to beam 21.

Beam 21 is carried by eccentric pins 22 and 23 (vide also FIG. 5) by means of downwardly protruding parts 21a. The pins 22 and 23 are fixedly attached to eccenter discs 24, 25 respectively. A cam disc 84 is fixedly connected to one of the pins 23. On this cam disc runs a roller 83, coupled, via lever 82, to a shaft 85 fixedly connected in its turn to a lever 86, the end of which is pivotally mounted to the strip 88 by means of a pin 87.

When the eccenter discs 24 and 25 are rotated at equal speed round their central axes, such as 27, the beam 21 will describe a circular path whilst retaining its horizontal position. The cam disc 84 will rotate with the eccenter disc 25, and the roller 83 will run along the circumference of the cam disc 84. Starting from the position shown in FIG. 7 and rotating disc 25 anticlockwise the radius of the cam disc, from the centerline of pin 23, remains the same, so that the arm 82 does not change its angular position. After a rotation of about 90° the radius of the cam disc quickly increases and the roller 83 is pushed farther away from pin 23, by which the shaft 85 starts to turn. Consequently, the strip 88, via the arm 86 and pin 87, moves to the left with respect to the beam 21. By this the shafts 20 are rotated anticlockwise, so that the brackets 18 with their lower ends will be swung to the right. An object between two brackets 17 and 18 is given more space and begins to slide downwards and finally will arrive in a transport pocket 5 which, in FIG. 7 has a linear movement to the right. The stroke of brackets 18 with respect to brackets 17 depends on the shape of cam disc 84. The moment at which the brackets start moving apart, can be adjusted by changing the angular position of the cam disc 84 with respect to the eccenter disc 25.

In the embodiment shown, the arms 17 are not moved with respect to the beam 21. It is possible, however, to mount a second cam mechanism, corresponding to 82–92 for driving the brackets 17. In practice, however, it was found that with the construction shown a working is obtained that is sufficiently free of shocks for handling eggs.

The construction of the transport pockets on transport device 6, is further illustrated by the FIGS. 9, 10 and 11.

The brackets 34 and 35 are fixedly mounted on blocks 95 and 96 respectively which can rotate in bearings such as 97, on pins 36, 37 respectively fixed by a nut 99 to a plate 100. This plate has been fixed by means of two hook pieces 101 to a link of chain 6. The bracket 38 is under the influence of torsion spring 102, the end 104 of which is fixed to the bracket 38 whilst the other end 103 is attached to the upper edge of the plate 100. The spring 102, that is located in a recess 98 of the block 95, exerts a force for rotating arm 38 anti-clockwise and so, normally, holds the bent over end of arm 38, carrying the roller 40, at the left hand end of groove 41 in arm 39 (FIG. 10). It will be clear that by swinging arm 38 clockwise (and consequently arm 39 anti-clockwise) the brackets 34 and 35 will move apart and discharge an object, such as an egg, that rests on them.

FIGS. 12, 13 and 14 show an embodiment of the discharge actionating mechanisms.

On the shaft 50 cam discs 105 are mounted, regularly spaced apart, which have a circular shape with a recess 106. On the periphery of each disc runs a following roller 107, which can rotate round pin 108 fixedly mounted to arm 109, that is pivotally mounted to a pin 110. To each arm 109 an abutment 111 is fixed by means of a pin 112.

From FIG. 13 it appears that a tension spring 113 holds the roller 107 in engagement with cam disc 105. When the roller 107 runs into the recess 106, the abutment 111 will swing into the path of the rollers 40. Should, however, a roller 40 be present at the place of an abutment no violent shocks will be caused, because the force swinging the abutment 111, is exclusively determined by spring 113. It was found that this is of great importance in order to avoid overloading the driving of shaft 50.

The cam discs are adjusted in such a way, that the angular position of the centres of the recesses 106 differs one step for each succeeding abutment, a step meaning a rotation of shaft 50 over an angle of 360°/n, n being the number of cam discs 105.

The working of the discharge device shown in FIG. 12 through 14 is based on the feature, that the rotational magnet 49 is energized for rotating one step, when an egg, that is discharged from a bucket 5 interrupts the light beam between the source 52 and the photocell 51 (FIG. 2, 2a, 3 and 4). The recesses 106 in the cams 105 are angularly such positioned, that on rotation of shaft 52 by one step the abutment 111, that is in the path of the rollers 40 is withdrawn from said path and the next abutment 111, seen in the direction opposite to the direction of movement of the conveyor chain 6 is put in said path. This means that in the drawing the abutments 111 are consecutively from left to right put in the path of the roller 40. When the most right hand abutment is withdrawn from said path the most left hand is put in.

FIG. 14 shows in more detail the signal transmitter for bringing into operation the shifting device for the trays 42 (as schematically shown in FIG. 2). The disc 114 has a hole 115 with an electric bulb 116 opposite to it. The photoresistance or photocell 117 can receive hardly any light but through this hole, so that a very low background level is obtained for the output signal of 117. The photocell device 122, 123, 124 of FIG. 2a is preferably constructed in the same way.

FIGS. 15 and 16 show a further embodiment of the discharge actionating device for the buckets 5. In these figures the same references are used for the same elements as in the preceding embodiment of FIGS 12 through 14.

A photocell 130 receives light from a light projector 131 via the light path 132. If an egg is present in a bucket 5 it will interrupt the light incidence to photocell 130 for a sufficiently long time to develop an output signal in the electrical circuit of photocell, that is not shown in the drawing but may be of any known suitable type. The light beam from projector 131 and the output circuit of photocell 130 are such, that a single bucket bracket will not cause an output control signal of the photocell 131.

The continuously rotating driving shaft 33, that carries the sprocket-wheels 30 on which the conveyor chain 6 (not shown) runs further carries a sprocket-wheel 133 that by means of a chain (not shown) drives sprocket-wheel 134 which by means of shaft 135 is coupled to a conical wheel 136 that engages a further conical wheel 137. This latter conical wheel is fixed to a shaft 138, supported in bearings 159 and 160.

Shaft 33 is continuously driven and consequently shaft 138 will also be continuously driven. The parts 133–138 are only shown by way of example and any construction giving a steady coupling of shafts 33 and 138 can be used.

Shaft 138 is provided with a number of friction couplings 139, one for each delivery station.

Each coupling 139 has a flange 140 non rotatably connected to shaft 138. A flange bush 141 is rotatably mounted on a bush 142 fixedly mounted on shaft 138. In holes in this flange bush 141 guide pins 142 are slidingly mounted, which pins are connected with a friction plate 143. A spring 144 urges a plate 144′ towards the friction plate 143, so that this friction plate continuously engages flange 140.

As is shown in FIG. 16 flange bush 141 is provided with a recess 145. A roller 146, rotatably mounted on arm 109 is continuously held against the circumference of flange bush 141 by a spring means (not shown) acting on arm 109 pivotally mounted at 110.

Shaft 33 carries a disc 161 having six holes 162, radially positioned in such a way that a light beam emitted by light projector 164 can pass a hole 162 and impinge on a photocell 163. One revolution of shaft 33 corresponds to a displacement of six transport pockets. Disc 161 is angularly so mounted that photocell 163 always receives light at the moment that the beam from projector 131 is directed at the centre of one of the conveyor buckets. The energizing is such that the magnet 49 is actionated when photocell 163 receives light and photocell 130 does not receive light from projector 131. Circuit means for obtaining this effect are well known to those schooled in electronics. Such a circuit may e.g. contain a gate, so connected to the outputs of the cells 130 and 163 that a signal only is gated when the said light receiving conditions of the photocells are present.

For each friction coupling 139 a hook lever 149 is pivotally mounted in the frame of the machine at 150. Each hook lever is provided with a pin 51 carrying a roller 152. This roller, by means of gravity, or by a spring (not shown) is held against a cam 153 fixedly mounted on shaft 50.

Each flange bush 141 is provided with a stop 154, that normally is held by the end 155 of hook arm 149. Each cam 153, however, has a protruding part 147 and when this part engages roller 152 the hook arm 149 is rotated clockwise through a small angle, such that stop 154 is not further held by the end 155 of hook arm 149.

Arm 109 at its lower end carries a transport pocket actionating abutment 156. This is moved in the path of travel of the transport pocket actionating rollers 40 if roller 146 gets into the recessed part 145 of bush flange 141.

The embodiment shown works as follows:

An egg in a bucket 5 will interrupt the light beam 132. Consequently the photocell 130 generates a signal for rotating the magnet 49 through one step. As already explained the signal for rotating magnet 49 is only generated when photocell 130 does not and photocell 163 does receive light, so that magnet 49 only is actioned, when the light beam 132 is interrupted at the moment that the center of a bucket passes by. When shaft 50 is rotated through one step because of the presence of an egg in a transport pocket, it rotates all cams 153. The protruding parts 147 of these cams are so positioned with respect to the rotational steps of shaft 50, that with each step only one protruding part engages its roller 152, to rotate the related hook arm 149, so that only one bush flange 141 is free to rotate, because its stop 154 is disengaged from the end 155 of the hook arm 149. By reason of this the considered bush flange 141 rotates through one revolution and is then again stopped by hook arm end 155, that has resumed its normal position because the protruding part 147 of cam 153 has passed the roller 151 which again engages the nonprotruding circumference of cam 153. During this single revolution of flange bush 141 its recess 145 will cooperate with roller 146 for swaying the abutment end 156 of arm 109 in the travel path of the rollers 40. The angular distance between the stop 154 and the recess 145 of each bush flange 141 is such, that the abutment 156 of the arm 109 cooperating with the relative bush flange 141, is just in the travel path of the rollers 40 when the roller 40 belonging to the bucket in which an egg was present that actionated photocell 130 arrives at the location of said abutment.

Should the photocells 130 and 163 in the meantime signal a further egg and actionate the rotation magnet 49 for moving a further step, then only the next bush flange 141 is freed, but this does not affect in any way the functioning of the earlier actionated bush flange. The sequence of actionating the bush flanges 141 is in FIG. 15 from left to right, whereas the buckets 5 move from right to left.

When all six delivery stations have been actionated a signal is developed by photocell 127 because a hole (not shown) in disc 114 then is aligned with light source 116 and photocell 127 for shifting the egg tray 42 through one egg row width to bring a new egg tray in the position to be filled with eggs delivered by the pockets 5.

It is an important advantage of this embodiment, that the falling height of the eggs is less than with the other shown embodiments of this invention because the egg needs only fall low enough for the upper side of it, when it has fallen in a pocket of the tray 42, to be below the conveyor bucket brackets. This means that the falling height may be smaller than the egg's length, because the lower end of the eggs protrudes below the bucket brackets. With the embodiment of FIGS. 12, 13 and 14 the falling height must at least equal the length of the eggs, as in this embodiment a falling egg has completely to pass across a light beam.

What I claim is:

1. The method of handling objects of approximately the same dimensions consisting in periodically and simultaneously filling a number of transfer pockets regularly placed in a row with the objects such that in each pocket one or no object is placed, transferring the pockets simultaneously such that they are moving above a conveyor that is provided with aligned buckets that are positioned in the same mutual distances as are the pockets in the row, continuously driving the conveyor in the direction of alignment of the buckets with a speed that approximately equals the speed with which the pockets are moving when they are oabove the conveyor, opening the pockets so that the objects contained in them slide downwards into the buckets of the conveyor, carrying the conveyor past a row of discharge stations and opening the buckets that contain an object one by one consecutively at the discharge stations such that if an object containing bucket has been opened at a certain station the next object containing bucket is opened at the next station seen in the direction opposite to that of the movement of the conveyor.

2. Method according to claim 1 in which a bucket that contains an object is opened at the most down stream positioned discharge station after the opening of a bucket that contains an object at the most up stream positioned discharge station.

3. The method of handling objects of approximately the same dimensions consisting in periodically and simultaneously filling a number of transfer pockets regularly placed in a row with the objects such that in each pocket one or no object is placed, transferring the pockets simultaneously such that they are moving above a conveyor that is provided with aligned buckets that are positioned in the same mutual distances as are the pockets in the row, continuously driving the conveyor in the direction of alignment of the buckets with a speed that approximately equals the speed with which the pockets are moving when they are above the conveyor, opening the pockets so that the objects contained in them slide downwards into the buckets of the conveyor, carrying the conveyor past a row of discharge stations, the mutual distance from center to center of which is greater than the mutual distance from center to center of the buckets of the conveyor and opening the buckets that contain an object one by one consecutively at the discharge stations such that if an object containing bucket has been opened at a certain station the next object containing bucket is opened at the next station seen in the direction opposite to that of the movement of the conveyor.

4. The method of handling objects of approximately the same dimensions and having a greater length than width, especially eggs, consisting in feeding the objects with a distance from center to center corresponding to a random distribution of one or more times a distance, that corresponds to the length of the objects, tilting the objects such that their length dimension is positioned vertically or approximately vertically, transferring the objects simultaneously to a continuously moving conveyor having a number of buckets in a row one behind the other in the direction of movement of the conveyor, carrying the conveyor past a row of discharge stations, the distance from center to center of the discharge stations being smaller than the distance from center to center of the conveyor buckets and opening the buckets that contain an object one by one consecutively at the discharge stations such that if an object containing bucket has been opened at a certain station the next object containing bucket is opened at the next station seen in the direction oposite to that of the movement of the conveyor.

5. The method according to claim 1 in which further the transfer of the objects to the conveyor is carried out by moving the transfer pockets along a circular path, the tangential velocity of the objects in the lower region of this circular path equalling or approximately equalling the velocity of the conveyor and opening the transfer pockets in the said lower region of their circular path.

6. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device being provided with means to bring the discharge actionating mechanisms one by one in their working position; and a detecting means for detecting the presence of an object connected with the control device.

7. Device for delivering objects comprising a transfer device having a number of transfer pockets in a row and a movably mounted carrying means for these pockets; a drive for moving the carrying means; a conveyor; a continuous drive for the conveyor, mounting and drive of the carrying means and conveyor being such that the carrying means in a portion of its movement moves substantially parallel to and with the same speed as the conveyor, said conveyor having a number of object receiving buckets, located one after the other in the direction of movement of the conveyor, a means for each pocket for opening same; a row of discharge stations located alongside the conveyor, each discharge station being provided with a discharge actionating mechanism that is adjustable into a rest position and into a working position in which it engages the opening means of a passing conveyor bucket; and a control device for the discharge actionating mechanisms said control device being provided with means to bring the discharge actionating mechanisms one by one into their working position; and detecting means for detecting the presence of an object, said detecting means being connected to the control device.

8. Device for delivering objects comprising a transfer device having a number of transfer pockets aligned in a row, an elongated carrying means for the pockets, excenters supporting the carrying means, an intermittent drive means for the excenters and means for opening the pockets, a conveyor mounted below said transfer device and having a number of object receiving buckets, located one after the other in the direction of movement of the conveyor, each bucket being provided with a means for opening same; a continuous drive for the conveyor, a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device being provided with means to bring the discharge actionating mechanisms one by one in their working position; and a detecting means for detecting the presence of an object connected with the control device.

9. Device for delivering objects comprising a transfer device having a number of transfer pockets aligned in a row, an elongated carrying means for the pockets, excenters supporting the carrying means, an intermittent drive means for the excenters, a cam disc mounted on one of said excenters, a cam follower opening means for the pockets coupled to the cam follower, a conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device being provided with means to bring the discharge actionating mechanisms one by one in their working position; and a detecting means for detecting the presence of an object connected with the control device.

10. Device according to claim 8 in which the cam follower is connected to an arm that is pivotably mounted in the carrying means, and provided with a strip connected to said arm and a pivotable opening link for each pocket connected to the strip.

11. A transfer device containing a row of transfer pockets each of which contains two downwardly converging brackets at least one of which is pivotally mounted; a carrying means for the brackets; at least two spaced eccenter pins supporting the carrying means, an eccenter for each of the eccenter pins, spaced parallel shafts supporting the eccenters and an intermittent drive for simultaneously rotating the eccenters through one revolution.

12. A transfer device containing a row of transfer pockets each of which contains two downwardly converging brackets at least one of which is pivotally mounted; a carrying means for the brackets; at least two spaced eccenter pins supporting the carrying means, an eccenter for each of the eccenter pins, spaced parallel shafts supporting the eccenters and an intermittent drive for simultaneously rotating the eccenters through one revolution, a cam disc mounted on one of the eccenters and a cam follower connected to an opening means of the pockets.

13. A transfer device containing a row of transfer pockets each of which contains two downwardly converging brackets at least one of which is pivotally mounted; a carrying means for the brackets; at least two spaced eccenter pins supporting the carrying means, an eccenter for each of the eccenter pins, spaced parallel shafts supporting the eccenters and an intermittent drive for simultaneously rotating the eccenters through one revolution, a cam disc mounted on one of the eccenters and a cam follower connected to an arm that is pivotally mounted to the carrying means; a strip connected to said arm and an opening link for each transfer pocket, each link being pivotally mounted to the carrying means and connected to the strip.

14. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a pivotally mounted lever provided with an abutment, a cam for each lever and mounted to cooperate therewith to pivot it, a common rotatable shaft fixedly supporting the cams and a rotational step mechanism for driving said shaft and a detecting means for detecting the presence of an object, said detecting means being connected with the rotational step mechanism.

15. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, each discharge station comprising a pivotally mounted lever that is adjustable into a rest position in which it does not engage the opening means of a passing conveyor bucket and a working position, in which it is in the path of the said opening means, said levers being urged by spring bias means in the direction of the working position; a control device for allowing the levers one by one to be pivoted into the working position; and a detecting means for detecting the presence of an object connected with the control device.

16. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device provided with means to bring the discharge actionating mechanisms one by one in their working position; a light projector; a photosensitive element, the light path from the projector to the photosensitive element being positioned below the conveyor in the region of the discharge stations and in which the output of the photosensitive device is connected to an electrical or electronical circuit giving a control signal each time the said light path is interrupted and again restored, the output of the circuit being connected to an electric rotational step device driving the control device.

17. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device provided with means to bring the discharge actionating mechanisms one by one in their working position; a light projector and a photosensitive element so positioned that the light path from said projector to said photosensitive element intersects the path of travel of an object when contained in a conveyor bucket in a point of said path of travel located before the discharge stations, said photosensitive element being connected to an output circuit adapted to give at an output a signal if an object in a transport pocket interrupts said light path, said output being connected to said control device; a retardation means individual to each delivery station and introducing a retardation that is adapted to the distance time the bucket needs to travel from the intersection point of the light path to the relative delivery station.

18. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device provided with means to bring the discharge actionating mechanisms one by one in their working position; a light projector and a photosensitive element so positioned that the light path from said projector to said photosensitive element intersects the path of travel of an object when contained in a conveyor bucket in a point of said path of travel located before the discharge stations, said photosensitive element being connected to an output circuit adapted to give at an output a signal if an object in a transport pocket interrupts said light path, said output being connected to said control device; a friction coupling for each discharge station, a common drive for all friction couplings that is mechanically coupled with the drive of the conveyor, the output part of each friction coupling being provided with a retaining means normally maintaining it in rest, and with a cam mechanism cooperating with the said discharge actionating mechanisms.

19. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device being provided with means to bring the discharge actionating mechanisms one by one in their working position; a light projector and a photosensitive element so positioned that the light path from said projector to said photosensitive element intersects the path of travel of an object when contained in a transport pocket in a point of said path of travel located before the delivery stations, a further photosensitive element, which is located at one side of a rotatably mounted disc rotationally coupled to said conveyor and provided with holes; a light source located at the other side of said disc, the holes in the disc being so located that light is transmitted from said light source to said further photosensitive element, when the center of a transport pocket is in the light path of the first mentioned photosensitive device; a control circuit connected to the outputs of both said photosensitive elements, said control circuit being provided with a means to generate a signal only if the first mentioned photosensitive element does not received light from its light projector and the further photosensitive element receives light from its source.

20. Device for delivering objects comprising a conveyor, a row of feeding stations, located alongside the conveyor, the conveyor having a number of object receiving buckets, located one after the other in the direction of movement of the conveyor, each bucket being provided with a means for opening same; a continuous drive for the conveyor; a row of discharge stations located alongside the transport device, each discharge station being provided with a discharge actionating mechanism, that is adjustable into a rest position and into a working position in which it engages the opening means of a passing conveyor bucket; a control device for the discharge actionating mechanisms, said control device being provided with means to bring the discharge actionating mechanisms one by one in their working position; a signal transmitter coupled to the control device for transmitting a signal whenever the control device has actuated all discharge stations; an output of said signal transmitter; a shifting mechanism for the object receiving receptacles positioned below the discharge stations; a driving means for the shifting mechanism; a second signal transmitter coupled to the shifting mechanism; a number of signal generating elements arranged in a predetermined pattern in said second signal transmitter; an output of said second signal transmitter, a further control device connected to both the outputs of the signal transmitters and to the driving means, said further control device being adapted to start the driving means on receipt of a signal from the first mentioned signal transmitter and to stop same on receipt of a signal from the further signal transmitter.

References Cited by the Examiner

UNITED STATES PATENTS

| | | | |
|---|---|---|---|
| 2,895,274 | 7/1959 | Mumma | 53—59 |
| 2,952,106 | 9/1960 | Rostron | 53—55 |

TRAVIS S. McGEHEE, *Primary Examiner.*

FRANK E. BAILEY, *Examiner.*